United States Patent
Li et al.

(10) Patent No.: US 11,487,100 B2
(45) Date of Patent: Nov. 1, 2022

(54) PRISM DEVICE APPLIED TO PERISCOPE LENS MODULE AND PERISCOPE LENS MODULE

(71) Applicant: AAC Optics Solutions Pte. Ltd., Singapore (SG)

(72) Inventors: Linzhen Li, Shenzhen (CN); Jiliang Lu, Shenzhen (CN); Gang Li, Shenzhen (CN); Jin Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 182 days.

(21) Appl. No.: 16/993,300

(22) Filed: Aug. 14, 2020

(65) Prior Publication Data
US 2020/0379242 A1 Dec. 3, 2020

Related U.S. Application Data

(63) Continuation of application No. PCT/CN2019/089726, filed on Jun. 1, 2019.

(51) Int. Cl.
*G02B 23/08* (2006.01)
*G02B 5/04* (2006.01)
*G02B 13/00* (2006.01)

(52) U.S. Cl.
CPC .............. *G02B 23/08* (2013.01); *G02B 5/04* (2013.01); *G02B 13/0015* (2013.01)

(58) Field of Classification Search
CPC ........ G02B 23/00; G02B 23/08; G02B 23/10; G02B 23/26; G02B 5/04; G02B 7/02; G02B 7/10; G02B 7/18; G02B 7/08; G02B 7/09; G02B 13/001; G02B 13/0015; G02B 27/64; G02B 27/646; G03B 5/00; G03B 5/06; G03B 17/12; H04N 5/225; H04N 5/232; H04N 5/2254; H04N 5/2253; H04N 5/2328; H04N 5/23258

(Continued)

(56) References Cited

U.S. PATENT DOCUMENTS

| | | | |
|---|---|---|---|
| 2020/0073140 A1* | 3/2020 | Eddington | G02B 7/1821 |
| 2020/0379239 A1* | 12/2020 | Li | G02B 13/0065 |
| 2020/0379243 A1* | 12/2020 | Li | G02B 5/04 |

FOREIGN PATENT DOCUMENTS

| | | | | |
|---|---|---|---|---|
| WO | WO-2016178152 A1 * | 11/2016 | | G02B 27/646 |
| WO | WO-2018158590 A1 * | 9/2018 | | F03G 7/065 |

\* cited by examiner

*Primary Examiner* — Jie Lei
(74) *Attorney, Agent, or Firm* — W&G Law Group (57) ABSTRACT

Provided is a prism device applied to a periscope lens module, including a bearing frame, a supporting-restoring assembly, a prism, and shape memory alloy wires. The shape memory alloy wires include first to fourth shape memory alloy wires. The first shape memory alloy wire and the second shape memory alloy wire are configured to drive the supporting-restoring assembly to drive the prism to rotate about a first rotation center axis. The third shape memory alloy wire and the fourth shape memory alloy wire are used to drive the supporting-restoring assembly to drive the prism to rotate about a second rotation center axis. The first rotation center axis is perpendicular to the second rotation center axis. The solutions of the present invention enable the prism to rotate towards two central axes that are perpendicular to each other, and has high stability and a simple structure, thereby achieving miniaturization.

14 Claims, 8 Drawing Sheets

(58) Field of Classification Search
USPC .................. 359/402–406, 496, 640, 831
See application file for complete search history.

PRISM DEVICE APPLIED TO PERISCOPE LENS MODULE AND PERISCOPE LENS MODULE

TECHNICAL FIELD

The present invention relates to the field of imaging devices, and more particularly, to a prism device applied to a periscope lens module and a periscope lens module including the prism device.

BACKGROUND

A periscope lens module is a lens module having optical zoom completed inside a body thereof. The periscope lens module generally includes a lens device, a prism device and an image sensor. In such periscope lens module, it is needed to control the prism device to rotate, in order to achieve automatic anti-shake, thereby improving imaging quality thereof. The existing structure for use in rotation of the prism is relatively complicated, and thus it is difficult to achieve miniaturization of the prism device.

Therefore, it is needed to provide a new prism device applied to the periscope lens module to solve the problems described above.

SUMMARY

The present invention aims to provide a prism device applied to a periscope lens module having a simple structure.

Technical solutions of the present invention will be described as follows.

The present invention provides a prism device applied to a periscope lens module, including: a bearing frame; a supporting-restoring assembly rotatably mounted to the bearing frame; a prism mounted to the supporting-restoring assembly and rotatable with the supporting-restoring assembly; and a plurality of shape memory alloy wires connected between the bearing frame and the supporting-restoring assembly and configured to drive the supporting-restoring assembly and the prism to rotate relative to the bearing frame. The bearing frame includes a base having a cavity and a support platform provided in the cavity. The plurality of shape memory alloy wires includes a first shape memory alloy wire, a second shape memory alloy wire, a third shape memory alloy wire, and a fourth shape memory alloy wire. The first shape memory alloy wire and the second shape memory alloy wire are connected to the supporting-restoring assembly and the bearing frame respectively from a first side portion and a second side portion of the support platform that are opposite to each other, to drive the supporting-restoring assembly to drive the prism to rotate about a first rotation center axis. The third shape memory alloy wire and the fourth shape memory alloy wire are connected to the supporting-restoring assembly and the bearing frame respectively from a third side portion and a fourth side portion of the support platform that are opposite to each other, to drive the supporting-restoring assembly to drive the prism to rotate about a second rotation center axis. The first rotation center axis is perpendicular to the second rotation center axis.

As an improvement, each of the plurality of shape memory alloy wires includes two ends fixed to the supporting-restoring assembly, and a middle portion connected to the bearing frame, in such a manner that each of the plurality of shape memory alloy wires is V-shaped.

As an improvement, the first side portion of the support platform is provided with a first locating protrusion, the second side portion of the support platform is provided with a second locating protrusion, the third side portion of the support platform is provided with a third locating protrusion, and the fourth side portion of the support platform is provided with a fourth locating protrusion; the middle portion of the first shape memory alloy wire is hooked to the first locating protrusion, the middle portion of the second shape memory alloy wire is hooked to the second locating protrusion, the middle portion of the third shape memory alloy wire is hooked to the third locating protrusion, and the middle portion of the fourth shape memory alloy wire is hooked to the fourth locating protrusion.

As an improvement, each of the first locating protrusion, the second locating protrusion, the third locating protrusion, and the fourth locating protrusion is provided with a hook groove for snapping and locating a respective one of the plurality of shape memory alloy wires, to prevent the shape memory alloy wire from escaping.

As an improvement, the prism device applied to the periscope lens module further includes a ball, wherein the supporting-restoring assembly is rotatably connected to the support platform through the ball, a surface of the support platform facing towards the supporting-restoring assembly is provided with a locating groove for receiving and locating the ball, and an arc groove for matching the ball is provided at a side of the supporting-restoring assembly facing towards the support platform.

As an improvement, the prism device applied to the periscope lens module further includes a magnet, wherein the support platform is provided with a mounting groove located between the locating groove and a bottom of the support platform, and the magnet is received in the mounting groove for attracting and locating the ball and the supporting-restoring assembly.

As an improvement, the supporting-restoring assembly includes a memory alloy wire-supporting member rotatably connected to the bearing frame, and an elastic supporting member provided between the memory alloy wire-supporting member and the prism and elastically connected to the bearing frame; the prism is mounted to the elastic supporting member; and the first shape memory alloy wire, the second shape memory alloy wire, the third shape memory alloy wire, and the fourth shape memory alloy wire are connected to the bearing frame and the memory alloy wire-supporting member.

As an improvement, the memory alloy wire-supporting member includes a first insulating bracket, a second insulating bracket, a circuit board, and a plurality of memory alloy wire brackets; the first insulating bracket is rotatably connected to the support platform and detachably snapped into the base; the plurality of memory alloy wire brackets is provided at a side of the first insulating bracket facing away from the support platform, and the plurality of memory alloy wire brackets is sequentially and circumferentially arranged while being spaced apart from each other; each of the plurality of shape memory alloy wires includes two ends connected to two adjacent memory alloy wire brackets of the plurality of memory alloy wire brackets, respectively; the circuit board is provided at a side of the plurality of memory alloy wire brackets facing away from the first insulating bracket, and the second insulating bracket is provided between the circuit board and the elastic supporting member.

As an improvement, a recess is provided at a side of the second insulating bracket facing away from the elastic supporting member, and the circuit board includes a connecting portion located between the second insulating bracket and the plurality of memory alloy wire brackets and received in the recess, and an extending portion extending from the connecting portion to outside of the bearing frame for being connected to a power supply; and/or each of the plurality of memory alloy wire brackets is provided with a connecting terminal connected to one of the plurality of shape memory alloy wires; and/or the elastic supporting member includes an elastic bracket elastically connected to the bearing frame, a holder provided between the elastic bracket and the memory alloy wire-supporting member, and a prism support provided at a side of the elastic bracket facing away from the holder; and the prism is mounted to the prism support.

The present invention further provides a periscope lens module, including a lens device, an image sensor, and the prism device applied to the periscope lens module as described above. The lens device is provided between the prism device and the image sensor.

Compared with the related art, in the embodiments of the present invention, the first shape memory alloy wire and the second shape memory alloy wire are connected to the supporting-restoring assembly and the bearing frame respectively from a first side of the support platform and a second side of the support platform that are opposite to each other, to drive the supporting-restoring assembly to drive the prism to rotate about a first rotation center axis; the third shape memory alloy wire and the fourth shape memory alloy wire are connected to the supporting-restoring assembly and the bearing frame respectively from a third side of the support platform and a fourth side of the support platform that are opposite to each other, to drive the supporting-restoring assembly to drive the prism to rotate about a second rotation center axis; and the first rotation center axis is perpendicular to the second rotation center axis. Therefore, in the embodiments of the present invention, the prism can rotate towards two center axes that are perpendicular to each other, thereby leading to a wider imaging angle and a better imaging effect thereof. The prism does not shake and is stable during rotation, thereby increasing stability of the prism device applied to the periscope lens module. In addition, the prism device applied to the periscope lens module has a simple structure, thereby achieving miniaturization of the prism device applied to the periscope lens module.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

In order to make the purpose, technical solutions and advantages of the present invention clearer, the present invention will be further described in details as follows in combination with the accompanying drawings and embodiments. It should be understood that the specific embodiments described herein are merely used to illustrate the present invention but not to limit the present invention. Based on the embodiments of the present invention, all other embodiments obtained by those skilled in the art without creative efforts shall fall into a protection scope of the present invention.

The terms "first", "second", "third", "fourth", etc. (if any) recorded in the description, claims and the accompanying drawings of the present invention are merely used to distinguish similar objects from each other but not to limit a specific order or sequence thereof. It should be understood that these terms used in this case can be interchanged under appropriate circumstances so that the embodiments described herein can be implemented in an order other than what is illustrated or described herein. In addition, the terms "including" and "having" and any variations thereof are intended to represent non-exclusive inclusions, for example, processes, methods, systems, products or devices that include a series of steps or units are not limited to these steps or units explicitly listed, but may include other steps or units not explicitly listed or inherent to these processes, methods, products, or devices.

It should be noted that the descriptions related to "first", "second", etc. in the present invention are merely for illustration, and shall not be understood as indicating or implying their relative importance or implicitly indicating the number of the indicated technical features. Thus, the features defined as "first" and "second" may include at least one of the features explicitly or implicitly. In addition, the technical solutions of various embodiments can be combined with each other on the basis that those skilled in the art can implement the combined technical solutions. In a case where a combination of the technical solutions leads to conflict or cannot be implemented, this combination shall be considered to be non-existent and not within a protection scope of the present invention.

Figure 1:
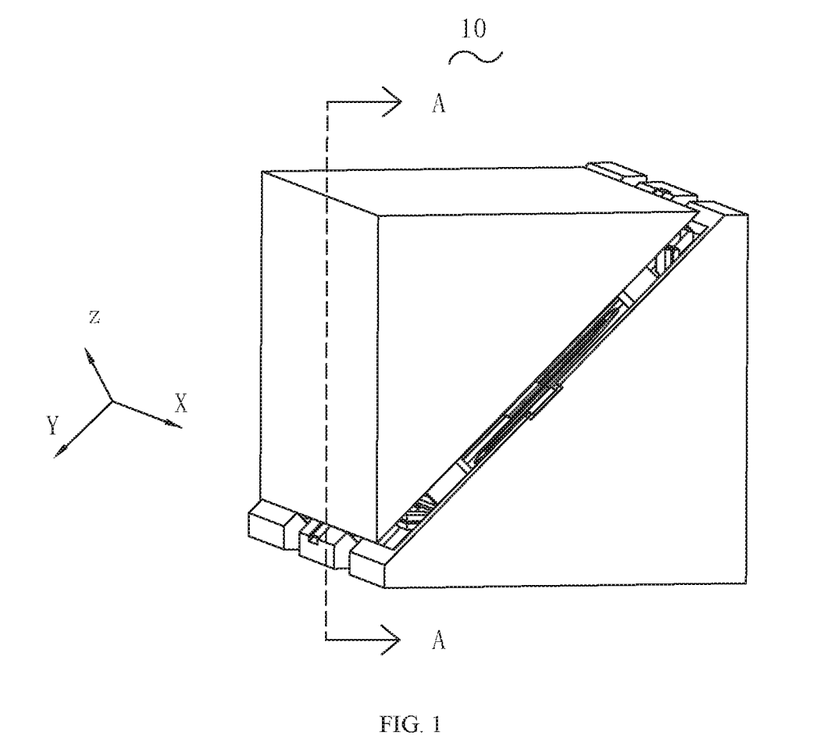
FIG. 1 is a schematic perspective view of a structure of a prism device applied to a periscope lens module according to an embodiment of the present invention.
Figure 2:
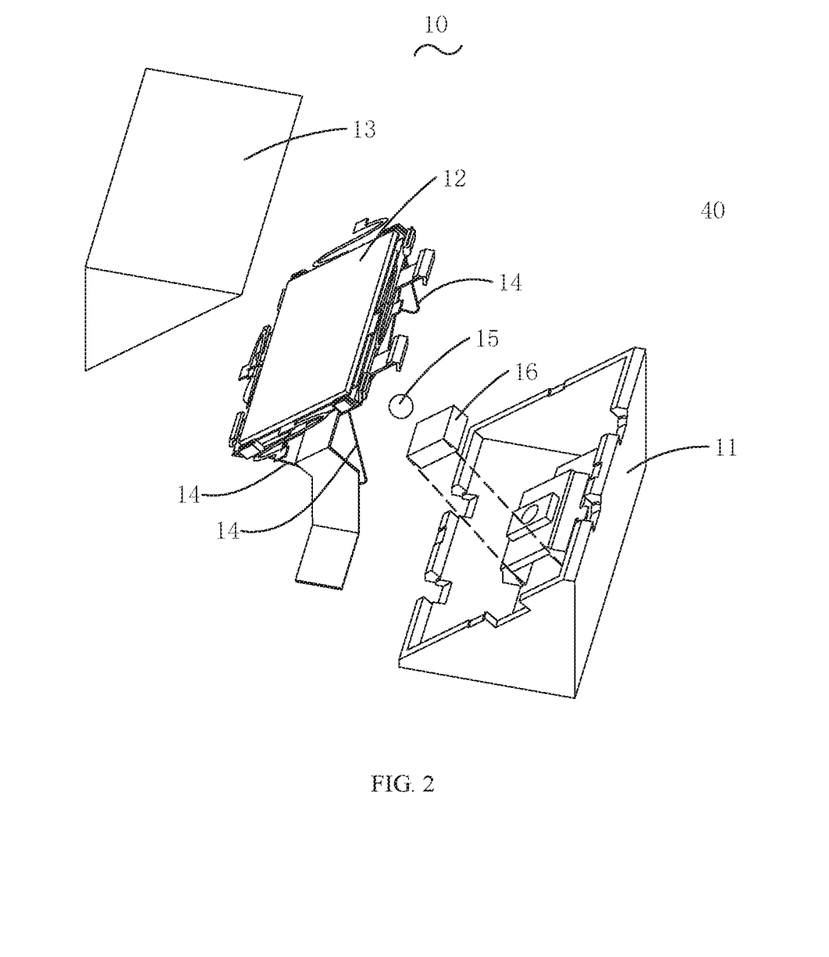
FIG. 2 is a schematic exploded view of a structure of a prism device applied to a periscope lens module according to an embodiment of the present invention.

With reference to FIG. 1 and FIG. 2, the present invention provides a prism device 10 applied to a periscope lens module. The prism device 10 applied to the periscope lens module includes: a bearing frame 11; a supporting-restoring assembly 12 mounted to the bearing frame 11 in a rotatable way; a prism 13 mounted to the supporting-restoring assembly 12 and rotatable with the supporting-restoring assembly 12; a number of shape memory alloy wires 14 connected between the bearing frame 11 and the supporting-restoring assembly 12 for driving the supporting-restoring assembly 12 and the prism 13 to rotate relative to the bearing frame 11; a ball 15; and a magnet 16. The magnet 16 is mounted to the bearing frame 11. The ball 15 is mounted between the supporting-restoring assembly 12 and the bearing frame 11 to achieve a connection between the supporting-restoring assembly 12 and the bearing frame 11 in a rollable way. The magnet 16 is configured to attract and locate the ball 15 and the supporting-restoring assembly 12. The ball 15 enables the prism 13 and the supporting-restoring assembly 12 to rotate in a better way. When the shape memory alloy wire 14 is energized, the shape memory alloy wire 14 can deform to drive the supporting-restoring assembly 12 to drive the prism 13 to rotate about a first rotation center axis and/or a second rotation center axis. The first rotation center axis (X axis) is perpendicular to the second rotation center axis (Y axis).

Figure 3:
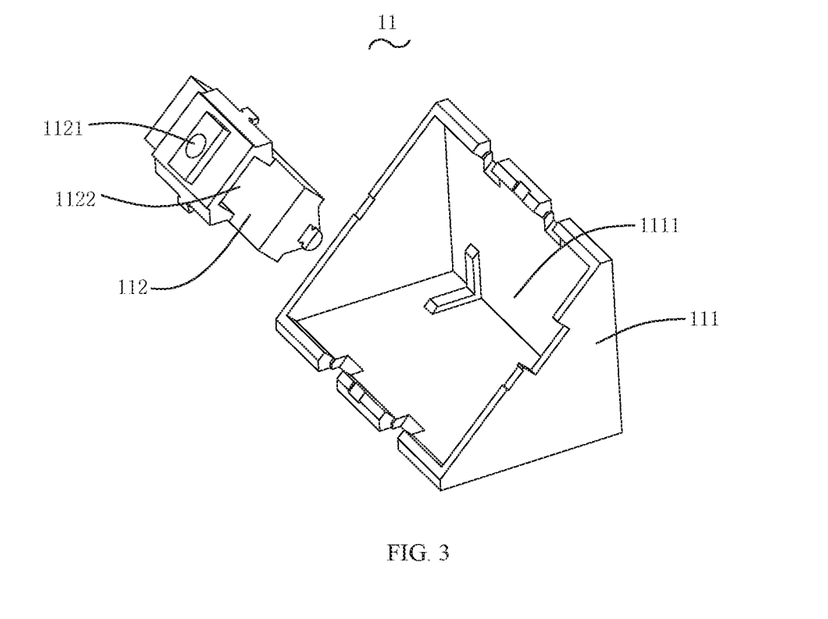
FIG. 3 is a schematic exploded view of a structure of a bearing frame according to an embodiment of the present invention.

With reference to FIG. 3, the bearing frame 11 includes a base 111 having a cavity 1111 and a support platform 112 provided in the cavity 1111.

The base 111 is configured to protect devices in the cavity 1111 of the base 111. A shape of the base 111 is not limited herein. In this embodiment, the base 111 has a shape of a substantially hollow triangular prism, and the cavity 1111 is formed at side surfaces of the triangular prism. In this embodiment, the supporting-restoring assembly 12, the shape memory alloy wire 14, the ball 15 and the magnet 16 are also disposed in the cavity 1111 of the base 111. A part of the supporting-restoring assembly 12 protrudes out of an opening of the cavity 1111, so that the prism 13 can be mounted and rotated in a better way.

A surface of the support platform 112 facing towards the supporting-restoring assembly 12 is provided with a locating groove 1121 for receiving and locating the ball 15. The support platform 112 is further provided with a mounting groove 1122 disposed between the locating groove 1121 and a bottom of the support platform 112. A shape of the locating groove 1121 matches a shape of the ball 15. In an example, a volume of the locating groove 1121 is smaller than or equal to half a volume of the ball 15. In this case, when the ball 15 is mounted into the locating groove 1121, half or even a smaller part of the ball 15 is received in the locating groove 1121, so that the ball 15 can in a rotatable contact with the supporting-restoring assembly 12 in a better way. The ball 15 and the supporting-restoring assembly 12 are each made of a permeability material. The mounting groove 1122 is configured to receive and locate the magnet 16, in such a manner that magnet 16 can attract and located the ball 15 and the supporting-restoring assembly 12.

Figure 4:
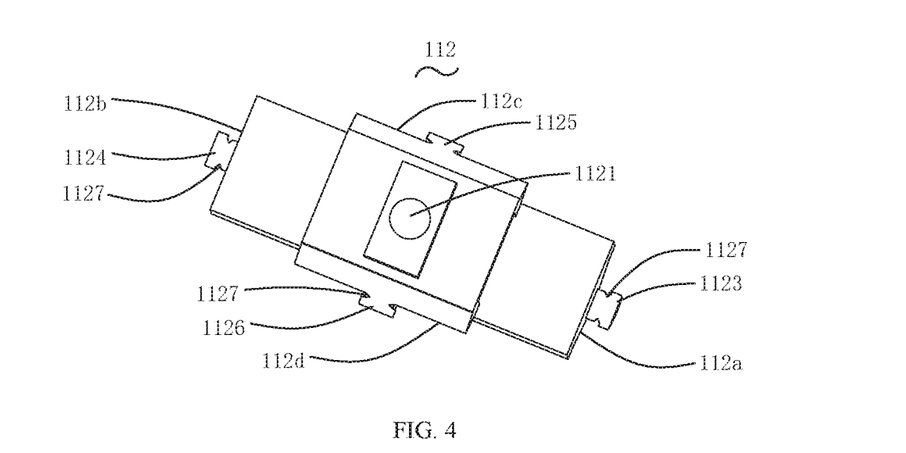
FIG. 4 is a schematic perspective view of a structure of a support platform according to an embodiment of the present invention.

With reference to FIG. 4, the support platform 112 includes a first side portion 112a and a second side portion 112b that are opposite to each other, and further includes a third side portion 112c and a fourth side portion 112d that are opposite to each other. The first side portion 112a is adjacent to the third side portion 112c and the fourth side portion 112d, and the second side portion 112b is also adjacent to the third side portion 112c and the fourth side portion 112d. The first side portion 112a of the support platform 112 is provided with a first locating protrusion 1123, the second side portion 112b of the support platform 112 is provided with a second locating protrusion 1124, the third side portion 112c of the support platform 112 is provided with a third locating protrusion 1125, and the fourth side portion 112d of the support platform 112 is provided with a fourth locating protrusion 1126. Each of the first locating protrusion 1123, the second locating protrusion 1124, the third locating protrusion 1125 and the fourth locating protrusion 1126 is configured to be connected to the shape memory alloy wire 14. In an example, the first locating protrusion 1123 and the second locating protrusion 1124 are located in a same straight line, the third locating protrusion 1125 and the fourth locating protrusion 1126 are located in a same straight line, and the straight line where the first locating protrusion 1123 and the second locating protrusion 1124 are located is perpendicular to the straight line where the third locating protrusion 1125 and the fourth locating protrusion 1126 are located. In this way, the shape memory alloy wire 14 can drive the supporting-restoring assembly 12 to drive the prism 13 to rotate about the first rotation center axis and the second rotation center axis. In this embodiment, the straight line where the first locating protrusion 1123 and the second locating protrusion 1124 are located is the first rotation center axis, that is, the first locating protrusion 1123 and the second locating protrusion 1124 are located in the X axis. The straight line where the third locating protrusion 1125 and the fourth locating protrusion 1126 are located is the second rotation center axis, that is, the third locating protrusion 1125 and the fourth locating protrusion 1126 are located in the Y axis. In an example, each of the first locating protrusion 1123, the second locating protrusion 1124, the third locating protrusion 1125 and the fourth locating protrusion 1126 is provided with a hook groove 1127 for receiving and locating a respective shape memory alloy wire 14, thereby preventing the shape memory alloy wire 14 from escaping. In this way, stability of the prism device 10 applied to the periscope lens module can be increased.

Figure 5:
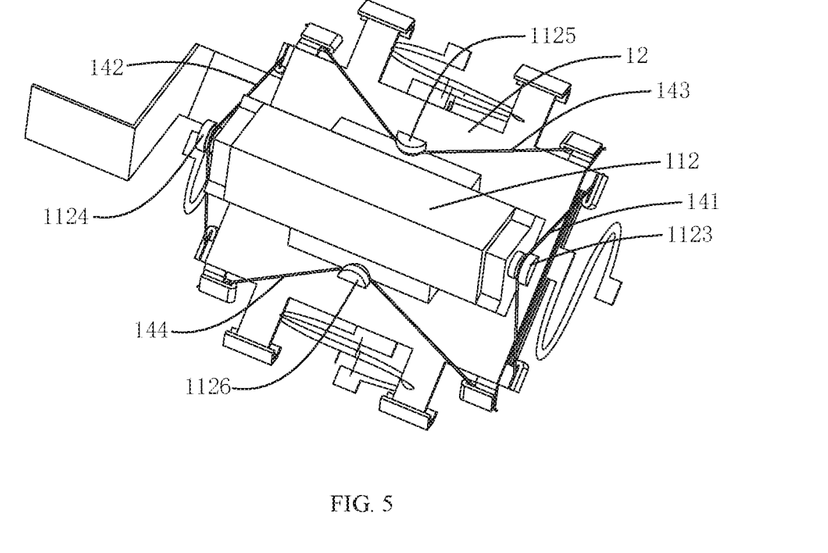
FIG. 5 is a schematic perspective view of structures of a support platform, a shape memory alloy wire and a supporting-restoring assembly according to an embodiment of the present invention.

With reference to FIG. 5, in this embodiment, the shape memory alloy wires 14 include a first shape memory alloy wire 141, a second shape memory alloy wire 142, a third shape memory alloy wire 143, and a fourth shape memory alloy wire 144. The first shape memory alloy wire 141 is configured to connect, from the first locating protrusion 1123 provided at a side of the support platform 112, the supporting-restoring assembly 12 with the bearing frame 11. The second shape memory alloy wire 142 is configured to connect, from the second locating protrusion 1124 provided at a side of the support platform 112, the supporting-restoring assembly 12 with the bearing frame 11. For example, the first shape memory alloy wire 141 includes two ends fixed to one side of the supporting-restoring assembly 12, and a middle portion hooked into the hook groove 1127 provided at the first locating protrusion 1123 of the bearing frame 11, the second shape memory alloy wire 142 includes two ends fixed to one side of the supporting-restoring assembly 12 opposite to the first shape memory alloy wire 141, and a middle portion hooked into the hook groove 1127 provided at the second locating protrusion 1124 of the bearing frame 11. The first shape memory alloy wire 141 and the second shape memory alloy wire 142 are each V-shaped. The first shape memory alloy wire 141 and the second shape memory alloy wire 142 are configured to drive the supporting-restoring assembly 12 to drive the prism 13 to rotate about the first rotation center axis. The third shape memory alloy wire 143 is configured to connect, from the third locating protrusion 1125 provided at a third side portion 112c of the support platform 112, the supporting-restoring assembly 12 with the bearing frame 11. The fourth shape memory alloy wire 144 is configured to connect, from the fourth locating protrusion 1126 provided at the fourth side portion 112d of the support platform 112, the supporting-restoring assembly 12 with the bearing frame 11. For example, the third shape memory alloy wire 143 includes two ends fixed to the third side portion 112c of the supporting-restoring assembly 12, and a middle portion hooked into the hook groove 1127 provided at the third locating protrusion 1125 of the bearing frame 11. The fourth shape memory alloy wire 144 includes two ends fixed to the fourth side portion 112d of the supporting-restoring assembly 12 opposite to the third shape memory alloy wire 143, and a middle portion hooked into the hook groove 1127 provided at the fourth locating protrusion 1126 of the bearing frame 11. The third shape memory alloy wire 143 and the fourth shape memory alloy wire 144 are each V-shaped. The third shape memory alloy wire 143 and the fourth shape memory alloy wire 144 are configured to drive the supporting-restoring assembly 12 to drive the prism 13 to rotate about the second rotation center axis.

Each of the first shape memory alloy wire 141, the second shape memory alloy wire 142, the third shape memory alloy wire 143, and the fourth shape memory alloy wire 144 may be the shape memory alloy wire 14. When the shape memory alloy wire 14 is heated by a current passing through the shape memory alloy wire, the shape memory alloy wire 14 shrinks and deforms to generate a deformation force, thereby driving the supporting-restoring assembly 12 and the prism 13 to rotate. For example, when the second shape memory alloy wire 142 is elongated due to a current, the supporting-restoring assembly 12 can rotate in a first direction about the first rotation center axis. When the first shape memory alloy wire 141 is elongated due to a current, the supporting-restoring assembly 12 can rotate in a second direction opposite to the first direction about the first rotation center axis.

Figure 6:
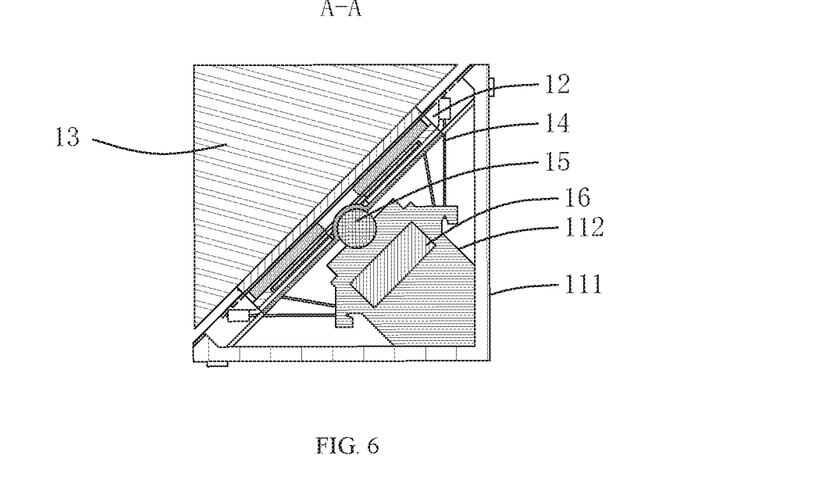
FIG. 6 is a schematic cross-sectional view along line A-A shown in FIG. 1.
Figure 7:
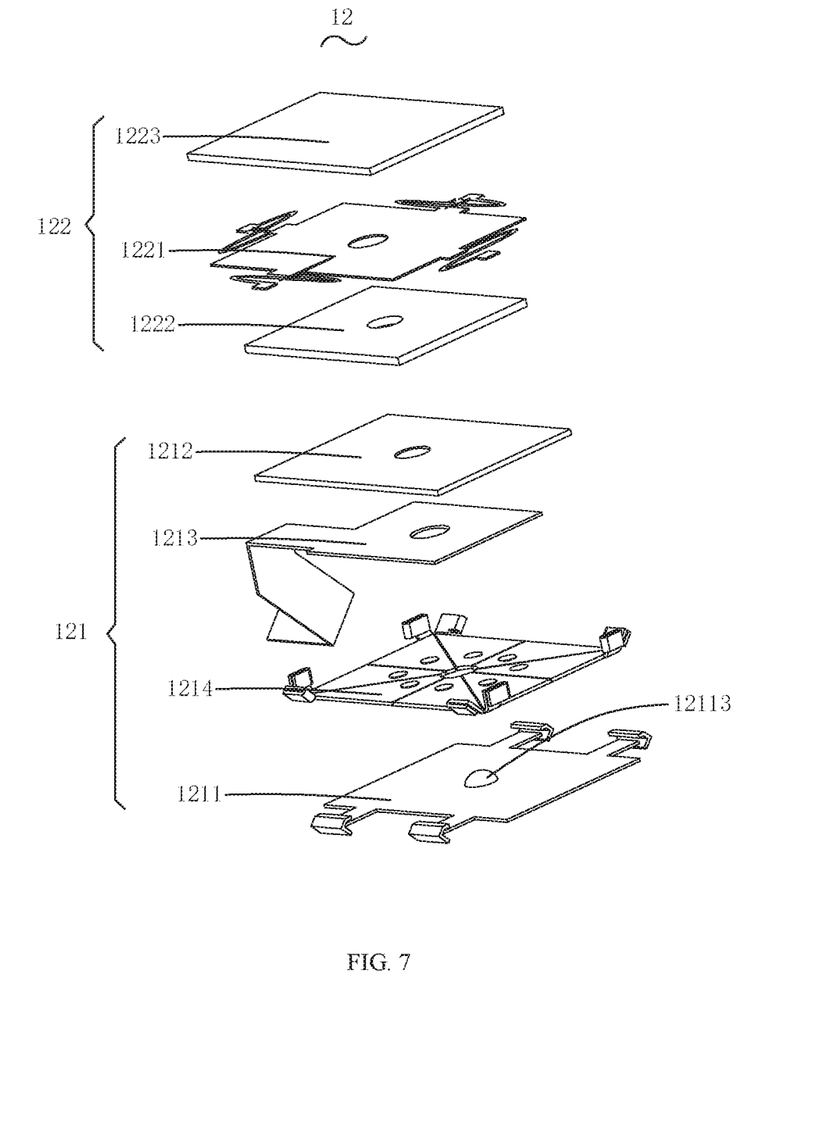
FIG. 7 is a schematic exploded view of a structure of a supporting-restoring assembly according to an embodiment of the present invention.

With reference to FIG. 6 and FIG. 7, the supporting-restoring assembly 12 is rotatably connected to the support platform 112 of the bearing frame 11 through the ball 15. The supporting-restoring assembly 12 includes a memory alloy wire-supporting member 121 rotatably connected to the support platform 112 of the bearing frame 11, and an elastic supporting member 122 provided between the memory alloy wire-supporting member 121 and the prism 13 and elastically connected to the bearing frame 11. The prism 13 is mounted to the elastic supporting member 122. The first shape memory alloy wire 141, the second shape memory alloy wire 142, the third shape memory alloy wire 143, and the fourth shape memory alloy wire 144 are respectively connected to the memory alloy wire-supporting member 121. The memory alloy wire-supporting member 121 is rotatably connected to the support platform 112 through the ball 15, and the memory alloy wire-supporting member 121 provides a connecting portion 11231 for the shape memory alloy wire 14. In this way, when the shape memory alloy wire 14 deforms, the elastic supporting member 122 and the prism 13 can be driven to rotate, and the memory alloy wire-supporting member 121 can provide a current to the shape memory alloy wire 14 to control the shape memory alloy wire 14 to deform. The elastic supporting member 122 is configured to connect the prism 13 with the memory alloy wire-supporting member 121. The elastic supporting member 122 provides a mounting position for the prism 13, and the elastic supporting member 122 can also press the memory alloy wire-supporting member 121 onto the ball 15.

The memory alloy wire-supporting member 121 includes a first insulating bracket 1211, a second insulating bracket 1212, a circuit board 1213, and a number of memory alloy wire brackets 1214. The first insulating bracket 1211 is rotatably connected to the support platform 112 and is detachably snapped into the base 111. The memory alloy wire brackets 1214 are provided at a side of the first insulating bracket 1211 facing away from the support platform 112, and the memory alloy wire brackets 1214 are sequentially and circumferentially arranged while being spaced apart from each other. Each of the shape memory alloy wires 14 includes two ends connected to two adjacent memory alloy wire brackets 1214. The circuit board 1213 is provided at a side of the memory alloy wire brackets 1214 facing away from the first insulating bracket 1211. The second insulating bracket 1212 is provided between the circuit board 1213 and the elastic supporting member 122. The circuit board 1213 is also electrically connected to each of the memory alloy wire brackets 1214. The circuit board 1213 and the memory alloy wire brackets 1214 are located between the first insulating bracket 1211 and the second insulating bracket 1212, which can avoid short circuit or electric leakage. The memory alloy wire brackets 1214 provide the connecting portion 11231 for the shape memory alloy wire 14, and each of the memory alloy wire brackets 1214 can conduct electricity and serve as a wire. The circuit board 1213 provides a current to the shape memory alloy wire 14 through the memory alloy wire bracket 1214, so as to drive the shape memory alloy wire 14 to deform.

Figure 8:
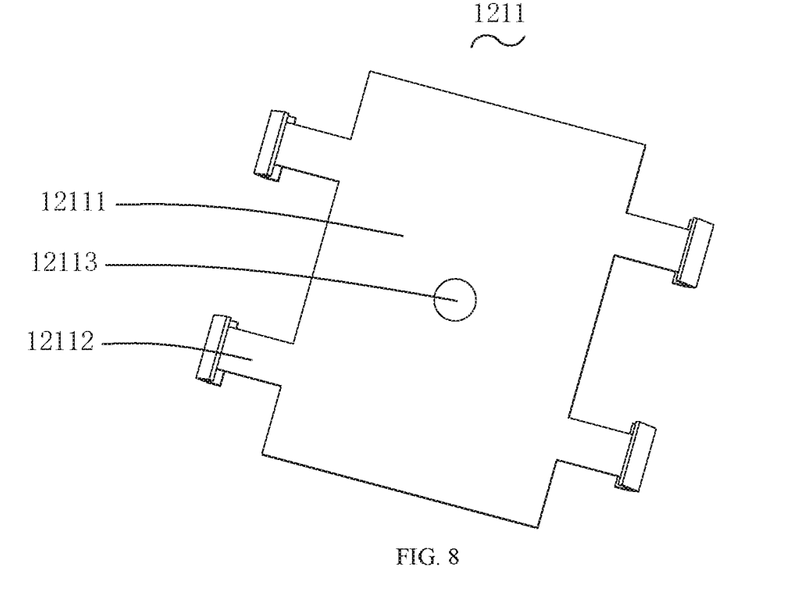
FIG. 8 is a schematic perspective view of a structure of a first insulating bracket according to an embodiment of the present invention.

With reference to FIG. 7 and FIG. 8, the first insulating bracket 1211 includes a first insulation body 12111 and at least two snap joints 12112. Each of two opposite sides of the first insulation body 12111 is connected to at least one snap joint 12112. The snap joint 12112 is configured to be snapped into the base 111.

The first insulation body 12111 has a roughly rectangular shape. A side of the first insulation body 12111 of the supporting-restoring assembly 12 facing towards the support platform 112 is provided with an arc groove 11213 for matching the ball 15. The arc groove 11213 receives the ball 15, in such a manner that when the first insulation body 12111 rotates relative to the ball 15 when rotating relative to the support platform 112. In this embodiment, the first insulation body 12111 has a small thickness, and the thickness of the first insulation body 12111 is smaller than a depth of the arc groove 11213. At a side of the first insulation body 12111 facing away from the ball 15, a protrusion 12114 is provided at a position corresponding to the arc groove 11213. The protrusion 12114 forms a bottom of the arc groove 11213, or the protrusion 12114 forms the bottom and a side of the arc groove 11213. In this embodiment, the protrusion 12114 is a spherical arc protrusion. In an example, the protrusion 12114 has a thickness that is the same as the thickness of the first insulation body 12111.

Four snap joints 12112 are provided, in which two of the snap joints 12112 are provided at one side of the first insulation body 12111, and the other two of the snap joints 12112 are provided at another side of the first insulation body 12111 opposite to the one side. It can be understood that the base 111 may be provided with a structure such as a recess, into which the snap joint 12112 is snapped.

Figure 9:
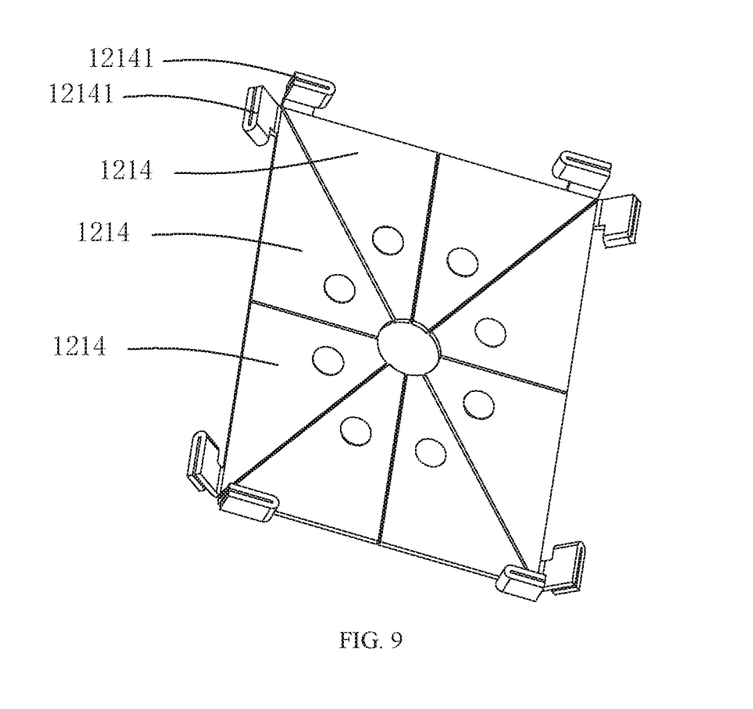
FIG. 9 is a schematic perspective view of a structure of a memory alloy wire bracket according to an embodiment of the present invention.

With reference to FIG. 9, the memory alloy wire bracket 1214 may be made of a conductive metal. In a case in which the memory alloy wire brackets 1214 are sequentially and circumferentially arranged while being spaced apart from each other, an avoiding hole is formed at a middle position for avoiding the protrusion 12114 on the first insulation body 12111. In this embodiment, eight memory alloy wire brackets 1214 are provided, and each of the memory alloy wire brackets 1214 is fixedly connected to an end of the shape memory alloy wire 14. Each of the memory alloy wire brackets 1214 is provided with a connecting terminal 12141 connected to the shape memory alloy wire 14. The eight memory alloy wire brackets 1214 that are sequentially and circumferentially arranged while being spaced apart from each other form a rectangular shape including four sides. Each side of the rectangular shape includes two ends, and each of the two ends is connected to one connecting terminal 12141. Each of the memory alloy wire brackets 1214 is electrically connected to the circuit board 1213.

Figure 10:
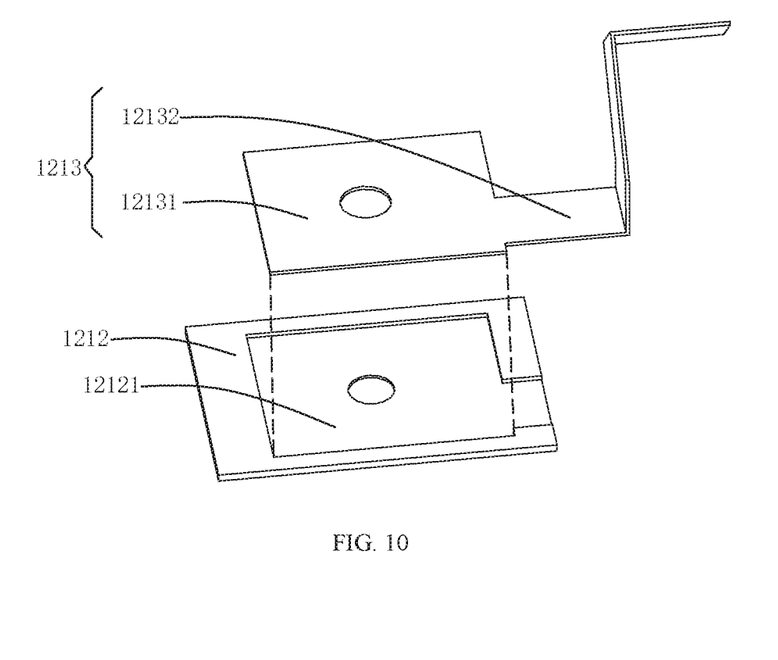
FIG. 10 is a schematic perspective view of structures of a second insulating bracket and a circuit board in an exploded state according to an embodiment of the present invention.

With reference to FIG. 10, the second insulating bracket 1212 has a rectangular shape. In an example, the second insulating bracket 1212 and the first insulation body 12111 are of uniform size, and a projection of the second insulating bracket 1212 onto the first insulating bracket 1211 overlaps with the first insulation body 12111. A recess 12121 is provided at a side of the second insulating bracket 1212 facing away from the elastic supporting member 122, and the recess 12121 is configured to receive the circuit board 1213. It can be understood that a hole may be formed in the second insulating bracket 1212 as needed to avoid the protrusion 12114 on the first insulation body 12111.

The circuit board 1213 includes a connecting portion 11231 located between the second insulating bracket 1212 and the memory alloy wire bracket 1214 and snapped into the recess 12121, and an extending portion 11232 extending from the connecting portion 11231 to outside of the bearing frame 11 to be connected to a power supply. The connecting portion 11231 is electrically connected to each memory alloy wire bracket 1214, respectively. The connecting portion 11231 includes a plurality of pads, and each memory alloy wire bracket 1214 is welded to the pads on the circuit board 1213, respectively. It can be understood that a hole may be formed in the connecting portion 11231 as needed to avoid the protrusion 12114 on the first insulation body 12111.

The elastic supporting member 122 includes an elastic bracket 1221 elastically connected to the bearing frame 11, a holder 1222 provided between the elastic bracket 1221 and the memory alloy wire-supporting member 121, and a prism support 1223 provided at a side of the elastic bracket 1221 facing away from the holder 1222. The prism 13 is mounted to the prism support 1223.

Figure 11:
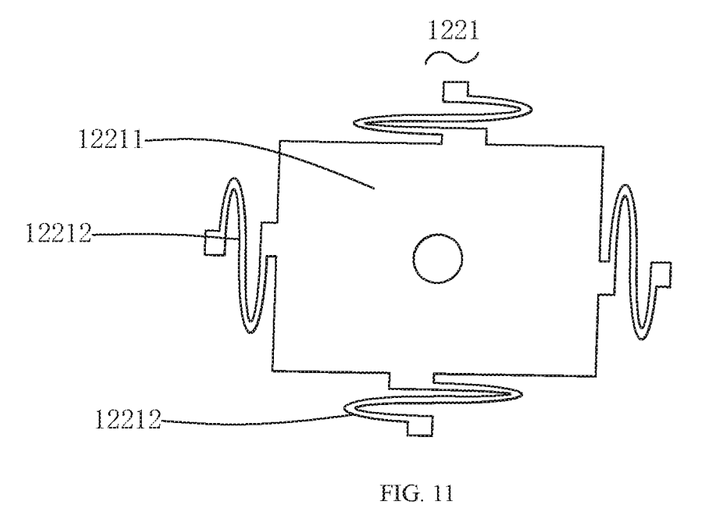
FIG. 11 is a schematic perspective view of a structure of an elastic bracket according to an embodiment of the present invention.

With reference to FIG. 11, the elastic bracket 1221 includes an elastic frame body 12211 and a plurality of elastic connectors 12212. The elastic frame body 12211 is connected to the base 111 through the elastic connectors 12212. The elastic connectors 12212 are elastic and do not impede rotation of the prism 13.

The elastic frame body 12211 has a rectangular shape. In an example, the elastic frame body 12211 and the first insulation body 12111 are of uniform size. A projection of the elastic frame body 12211 onto the first insulating bracket 1211 overlaps with the first insulation body 12111. Each of four adjacent sides of the elastic frame body 12211 is connected to one elastic connector 12212.

The elastic connector 12212 has a roughly S shape, and includes one end connected to the base 111 and the other end connected to an elastic frame. The S shape has the better elasticity.

The holder 1222 has a rectangular shape. In an example, the holder 1222 and the first insulation body 12111 are of uniform size, and a projection of the holder 1222 onto the first insulating bracket 1211 overlaps with the first insulation body 12111. The holder 1222 may be made of a rigid material. The holder 1222 basically does not deform. In an example, the holder 1222 is made of a material including iron, so that the magnet 16 can attract the holder 1222 to clamp the memory alloy wire-supporting member 121.

The prism support 1223 has a rectangular shape. In an example, the prism support 1223 and the first insulation body 12111 are of uniform size, and a projection of the holder 1222 onto the first insulating bracket 1211 overlaps with the first insulation body 12111. In an example, the prism support 1223 is made of a material including iron, so that the magnet 16 can attract the prism support 1223 to clamp the holder 1222, the elastic bracket 1221, and the memory alloy wire-supporting member 121. The prism 13 can be fixed to the prism support 1223 by an adhesive or the like.

The prism 13 has a shape of a roughly triangular prism. When the prism 13 is mounted to the prism support 1223, the prism device 10 applied to the periscope lens module has a shape of a roughly rectangular prism.

Figure 12:
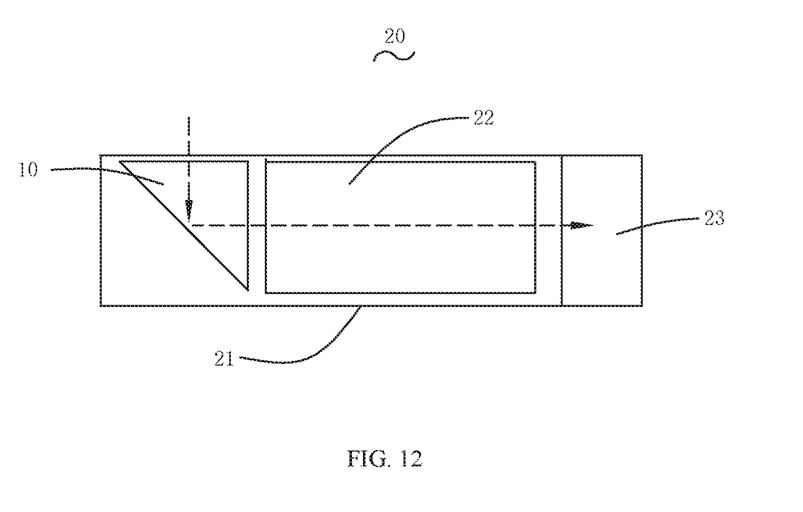
FIG. 12 is a schematic view of a structure of a periscope lens module according to an embodiment of the present invention.

With reference to FIG. 12, the present invention further provides a periscope lens module 20, which includes a shell frame 21, a lens device 22, an image sensor 23, and the prism device 10 applied to the periscope lens module as described above. The lens device 22 is mounted to a middle part of the shell frame 21. The image sensor 23 is mounted to an end of the shell frame 21 and located at an image side of the lens device 22. The prism device 10 applied to the periscope lens module is mounted to the other end of the frame 21 and located at an object side of the lens device 22. Light is reflected by the prism device 10 applied to the periscope lens module 20, and then travels along a direction of an axis of the lens device 22 to reach the image sensor 23 in a straight-line direction, so as to achieve imaging. The dotted line shown in FIG. 12 is a light transmission direction. The periscope lens module 20 can be applied to an electronic device with an imaging function. For example, the electronic device with the imaging function is a mobile phone or a camera.

The above description merely illustrates some embodiments of the present invention. It should be noted that those skilled in the art can make improvements without departing from a creative concept of the present invention, but all these improvements shall fall into a scope of the present invention.

What is claimed is:

1. A prism device applied to a periscope lens module, comprising:
    a bearing frame;
    a supporting-restoring assembly rotatably mounted to the bearing frame;
    a prism mounted to the supporting-restoring assembly and rotatable with the supporting-restoring assembly; and
    a plurality of shape memory alloy wires connected between the bearing frame and the supporting-restoring assembly and configured to be energized by a power supply for generating deformations for driving the supporting-restoring assembly and the prism to rotate relative to the bearing frame,
    wherein the bearing frame comprises a base having a cavity and a support platform provided in the cavity, and the plurality of shape memory alloy wires comprises a first shape memory alloy wire, a second shape memory alloy wire, a third shape memory alloy wire, and a fourth shape memory alloy wire; the first shape memory alloy wire and the second shape memory alloy wire are connected to the supporting-restoring assembly and the bearing frame respectively from a first side portion and a second side portion of the support platform that are opposite to each other, to drive the supporting-restoring assembly and the prism to rotate about a first rotation center axis; the third shape memory alloy wire and the fourth shape memory alloy wire are connected to the supporting-restoring assembly and the bearing frame respectively from a third side portion and a fourth side portion of the support platform that are opposite to each other, to drive the supporting-restoring assembly and the prism to rotate about a second rotation center axis; and the first rotation center axis is perpendicular to the second rotation center axis, the supporting-restoring assembly comprises a memory alloy wire-supporting member rotatably connected to the bearing frame, and an elastic supporting member provided between the memory alloy wire-supporting member and the prism and elastically connected to the bearing frame; the prism is mounted to the elastic supporting member; and the first shape memory alloy wire, the second shape memory alloy wire, the third shape memory alloy wire, and the fourth shape memory alloy wire are connected to the bearing frame and the memory alloy wire-supporting member; the memory alloy wire-supporting member comprises a first insulating bracket, a second insulating bracket, a circuit board, and a plurality of memory alloy wire brackets; the first insulating bracket is rotatably connected to the support platform and detachably snapped into the base; the plurality of memory alloy wire brackets is provided at a side of the first insulating bracket facing away from the support platform, and the plurality of memory alloy wire brackets is sequentially and circumferentially arranged while being spaced apart from each other; each of the plurality of memory alloy wire brackets is conductive and is electrically connected to the circuit board, respectively; the circuit board is electrically connected to the power supply; each of the plurality of shape memory alloy wires comprises two ends connected to two adjacent memory alloy wire brackets of the plurality of memory alloy wire brackets, respectively; the circuit board is provided at a side of the plurality of memory alloy wire brackets facing away from the first insulating bracket, and the second insulating bracket is provided between the circuit board and the elastic supporting member.

2. The prism device applied to the periscope lens module as described in claim 1, wherein each of the plurality of shape memory alloy wires comprises two ends fixed to the supporting-restoring assembly, and a middle portion connected to the bearing frame, in such a manner that each of the plurality of shape memory alloy wires is V-shaped.

3. The prism device applied to the periscope lens module as described in claim 2, wherein the first side portion of the support platform is provided with a first locating protrusion, the second side portion of the support platform is provided with a second locating protrusion, the third side portion of the support platform is provided with a third locating protrusion, and the fourth side portion of the support platform is provided with a fourth locating protrusion; the middle portion of the first shape memory alloy wire is hooked to the first locating protrusion, the middle portion of the second shape memory alloy wire is hooked to the second locating protrusion, the middle portion of the third shape memory alloy wire is hooked to the third locating protrusion, and the middle portion of the fourth shape memory alloy wire is hooked to the fourth locating protrusion.

4. The prism device applied to the periscope lens module as described in claim 3, wherein each of the first locating protrusion, the second locating protrusion, the third locating protrusion, and the fourth locating protrusion is provided with a hook groove for snapping and locating a respective one of the plurality of shape memory alloy wires, to prevent the shape memory alloy wire from escaping.

5. The prism device applied to the periscope lens module as described in claim 1, further comprising a ball, wherein the supporting-restoring assembly is rotatably connected to the support platform through the ball, a surface of the support platform facing towards the supporting-restoring assembly is provided with a locating groove for receiving and locating the ball, and an arc groove for matching the ball is provided at a side of the supporting-restoring assembly facing towards the support platform.

6. The prism device applied to the periscope lens module as described in claim 5, further comprising a magnet, wherein the support platform is provided with a mounting groove located between the locating groove and a bottom of the support platform, and the magnet is received in the mounting groove for attracting and locating the ball and the supporting-restoring assembly.

7. The prism device applied to the periscope lens module as described in claim 1, wherein a recess is provided at a side of the second insulating bracket facing away from the elastic supporting member, and the circuit board comprises a connecting portion located between the second insulating bracket and the plurality of memory alloy wire brackets and received in the recess, and an extending portion extending from the connecting portion to outside of the bearing frame for being connected to a power supply; and/or
    each of the plurality of memory alloy wire brackets is provided with a connecting terminal connected to one of the plurality of shape memory alloy wires; and/or
    the elastic supporting member comprises an elastic bracket elastically connected to the bearing frame, a holder provided between the elastic bracket and the memory alloy wire-supporting member, and a prism support provided at a side of the elastic bracket facing away from the holder; and the prism is mounted to the prism support.

8. A periscope lens module, comprising:
a lens device;
an image sensor; and
a prism device,
wherein the lens device is provided between the prism device and the image sensor, and
wherein the prism device comprises:
a bearing frame;
a supporting-restoring assembly rotatably mounted to the bearing frame;
a prism mounted to the supporting-restoring assembly and rotatable with the supporting-restoring assembly; and
a plurality of shape memory alloy wires connected between the bearing frame and the supporting-restoring assembly and configured to be energized by a power supply for generating deformations for driving the supporting-restoring assembly and the prism to rotate relative to the bearing frame,
wherein the bearing frame comprises a base having a cavity and a support platform provided in the cavity, and the plurality of shape memory alloy wires comprises a first shape memory alloy wire, a second shape memory alloy wire, a third shape memory alloy wire, and a fourth shape memory alloy wire; the first shape memory alloy wire and the second shape memory alloy wire are connected to the supporting-restoring assembly and the bearing frame respectively from a first side portion and a second side portion of the support platform that are opposite to each other, to drive the supporting-restoring assembly and the prism to rotate about a first rotation center axis; the third shape memory alloy wire and the fourth shape memory alloy wire are connected to the supporting-restoring assembly and the bearing frame respectively from a third side portion and a fourth side portion of the support platform that are opposite to each other, to drive the supporting-restoring assembly and the prism to rotate about a second rotation center axis; and the first rotation center axis is perpendicular to the second rotation center axis, the supporting-restoring assembly comprises a memory alloy wire-supporting member rotatably connected to the bearing frame, and an elastic supporting member provided between the memory alloy wire-supporting member and the prism and elastically connected to the bearing frame; the prism is mounted to the elastic supporting member; and the first shape memory alloy wire, the second shape memory alloy wire, the third shape memory alloy wire, and the fourth shape memory alloy wire are connected to the bearing frame and the memory alloy wire-supporting member; the memory alloy wire-supporting member comprises a first insulating bracket, a second insulating bracket, a circuit board, and a plurality of memory alloy wire brackets; the first insulating bracket is rotatably connected to the support platform and detachably snapped into the base; the plurality of memory alloy wire brackets is provided at a side of the first insulating bracket facing away from the support platform, and the plurality of memory alloy wire brackets is sequentially and circumferentially arranged while being spaced apart from each other; each of the plurality of memory alloy wire brackets is conductive and is electrically connected to the circuit board, respectively; the circuit board is electrically connected to the power supply; each of the plurality of shape memory alloy wires comprises two ends connected to two adjacent memory alloy wire brackets of the plurality of memory alloy wire brackets, respectively; the circuit board is provided at a side of the plurality of memory alloy wire brackets facing away from the first insulating bracket, and the second insulating bracket is provided between the circuit board and the elastic supporting member.

9. The periscope lens module as described in claim 8, wherein each of the plurality of shape memory alloy wires comprises two ends fixed to the supporting-restoring assembly, and a middle portion connected to the bearing frame, in such a manner that each of the plurality of shape memory alloy wires is V-shaped.

10. The periscope lens module as described in claim 9, wherein the first side portion of the support platform is provided with a first locating protrusion, the second side portion of the support platform is provided with a second locating protrusion, the third side portion of the support platform is provided with a third locating protrusion, and the fourth side portion of the support platform is provided with a fourth locating protrusion; the middle portion of the first shape memory alloy wire is hooked to the first locating protrusion, the middle portion of the second shape memory alloy wire is hooked to the second locating protrusion, the middle portion of the third shape memory alloy wire is hooked to the third locating protrusion, and the middle portion of the fourth shape memory alloy wire is hooked to the fourth locating protrusion.

11. The periscope lens module as described in claim 10, wherein each of the first locating protrusion, the second locating protrusion, the third locating protrusion, and the fourth locating protrusion is provided with a hook groove for snapping and locating a respective one of the plurality of shape memory alloy wires, to prevent the shape memory alloy wire from escaping.

12. The periscope lens module as described in claim 8, further comprising a ball, wherein the supporting-restoring assembly is rotatably connected to the support platform through the ball, a surface of the support platform facing towards the supporting-restoring assembly is provided with a locating groove for receiving and locating the ball, and an arc groove for matching the ball is provided at a side of the supporting-restoring assembly facing towards the support platform.

13. The periscope lens module as described in claim 12, further comprising a magnet, wherein the support platform is provided with a mounting groove located between the locating groove and a bottom of the support platform, and the magnet is received in the mounting groove for attracting and locating the ball and the supporting-restoring assembly.

14. The periscope lens module as described in claim 8, wherein a recess is provided at a side of the second insulating bracket facing away from the elastic supporting member, and the circuit board comprises a connecting portion located between the second insulating bracket and the plurality of memory alloy wire brackets and received in the recess, and an extending portion extending from the connecting portion to outside of the bearing frame for being connected to a power supply; and/or  each of the plurality of memory alloy wire brackets is provided with a connecting terminal connected to one of the plurality of shape memory alloy wires; and/or  the elastic supporting member comprises an elastic bracket elastically connected to the bearing frame, a holder provided between the elastic bracket and the memory alloy wire-supporting member, and a prism support provided at a side of the elastic bracket facing away from the holder; and the prism is mounted to the prism support.

\* \* \* \* \*